United States Patent
Otani (10) Patent No.: US 9,275,268 B2
(45) Date of Patent: Mar. 1, 2016

(54) IMAGE PROCESSING DEVICE, IMAGE PROCESSING METHOD, AND NON-TRANSITORY RECORDING MEDIUM

(71) Applicant: CASIO COMPUTER CO., LTD., Shibuya-ku, Tokyo (JP)

(72) Inventor: Daisuke Otani, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/324,458

(22) Filed: Jul. 7, 2014

(65) Prior Publication Data

US 2015/0043829 A1  Feb. 12, 2015

(30) Foreign Application Priority Data

Aug. 6, 2013  (JP) ................. 2013-163659

(51) Int. Cl.
  G06K 9/46  (2006.01)
  G06K 9/00  (2006.01)
  G06K 9/50  (2006.01)

(52) U.S. Cl.
  CPC .............. *G06K 9/00228* (2013.01); *G06K 9/50* (2013.01)

(58) Field of Classification Search
  CPC ..... G06K 9/32; G06K 9/4604; G06K 9/4609; G06K 9/4652; G06K 9/68
  USPC .......................... 382/203, 237, 270, 252, 271
  See application file for complete search history.

(56) References Cited

U.S. PATENT DOCUMENTS

| 7,884,874 B2 | 2/2011 | Sugimoto | |
| 2003/0194136 A1* | 10/2003 | Fujii et al. | 382/209 |
| 2012/0243796 A1* | 9/2012 | Saito | 382/218 |

FOREIGN PATENT DOCUMENTS

| JP | 2001307112 A | 11/2001 |
| JP | 2005286940 A | 10/2005 |
| JP | 2008004123 A | 1/2008 |

OTHER PUBLICATIONS

Japanese Office Action (and English translation thereof) dated Apr. 21, 2015, issued in counterpart Japanese Application No. 2013-163659.
Japanese Office Action (and English translation thereof) dated Dec. 15, 2015, issued in counterpart Japanese Application No. 2013-163659.

* cited by examiner

*Primary Examiner* — Manuchehr Rahmjoo
(74) *Attorney, Agent, or Firm* — Holtz, Holtz & Volek PC (57) ABSTRACT

The binary processor of a digital camera turns an image targeted to recognize a particular shape into a binary image. The searcher searches for a valid pixel that is a pixel satisfying a given condition from the binary image. The determiner determines whether the region comprising a set of valid pixels has a particular shape when it is determined that a valid pixel is detected during the search. The retainer retains position information showing the position of the region comprising the set of valid pixels and determined to have the particular shape when the determiner determines that the region has the particular shape.

6 Claims, 7 Drawing Sheets

IMAGE PROCESSING DEVICE, IMAGE PROCESSING METHOD, AND NON-TRANSITORY RECORDING MEDIUM

CROSS-REFERENCE TO RELATED APPLICATION

This application claims the benefit of Japanese Patent Application No. 2013-163659, filed on Aug. 6, 2013, the entire disclosure of which is incorporated by reference herein.

FIELD

This application relates to an image processing device, image processing method, and non-transitory recording medium.

BACKGROUND

Various techniques for recognizing a given shape contained in an image are known in the prior art.

For example, the Hough conversion is generally known as a technique for recognizing a geometric shape (such as a circle) in an image.

On the other hand, as described in Unexamined Japanese Patent Application Kokai Publication No. 2005-286940, it is known to prepare multiple face patterns in advance and conducting pattern-matching with the face appearing in an image as a technique for recognizing an object shape (such as a face) in an image.

SUMMARY

The image processing device according to a first exemplary aspect of the present disclosure comprises:

an image acquirer acquiring an image;

a searcher searching for a pixel satisfying a given condition from the image acquired by the image acquirer;

a first determiner determining whether the pixel satisfying a given condition is detected during the search by the searcher;

a second determiner determining whether the region comprising a set of pixels has a particular shape when the first determiner determines that the pixel satisfying a given condition is detected; and a retainer retaining position information showing the position of the region comprising the set of pixels when the second determiner determines that the region has the particular shape.

The image processing method according to a second exemplary aspect of the present disclosure comprises:

an image acquisition step of acquiring an image;

a search step of searching for a pixel satisfying a given condition from the image acquired in the image acquisition step;

a first determination step of determining whether the pixel satisfying a given condition is detected during the search in the search step;

a second determination step of determining whether the region comprising a set of pixels has a particular shape when it is determined in the first determination step that the pixel satisfying a given condition is detected; and a retention step of retaining position information showing the position of the region comprising the set of pixels when it is determined in the second determination step that the region has the particular shape.

The non-transitory recording medium according to a third exemplary aspect of the present disclosure records programs that allows a computer to function as:

an image acquirer acquiring an image;

a searcher searching for a pixel satisfying a given condition from the image acquired by the image acquirer;

a first determiner determining whether the pixel satisfying a given condition is detected during the search by the searcher;

a second determiner determining whether the region comprising a set of pixels has a particular shape when the first determiner determines that the pixel satisfying a given condition is detected; and a retainer retaining position information showing the position of the region comprising the set of pixels when the second determiner determines that the region has the particular shape.

BRIEF DESCRIPTION OF THE DRAWINGS

A more complete understanding of this application can be obtained when the following detailed description is considered in conjunction with the following drawings, in which.

DETAILED DESCRIPTION

An embodiment of the present disclosure will be described hereafter based on the drawings. In this embodiment, a digital camera 100 executes the shape recognition procedure by way of example.

Figure 1:
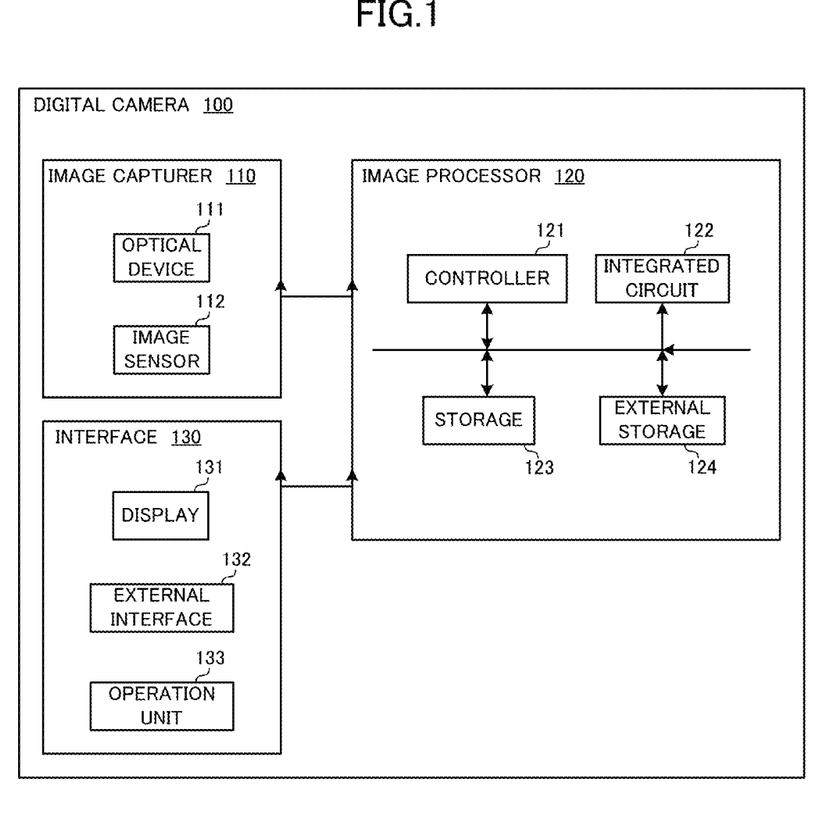
FIG. 1 is a block diagram showing the hardware configuration of a digital camera according to an embodiment of the present disclosure.

As shown in FIG. 1, the digital camera 100 is an imaging device comprising an image capturer 110, an image processor 120, and an interface 130.

The image capturer 110 comprises an optical device 111 and an image sensor 112 and conducts the image capture operation of the digital camera 100.

The optical device 111 comprises a lens, diaphragm, shutter, and the like. The optical device 111 collects the incident light and adjusts the optical elements such as the field angle and focal point.

The image sensor 112 comprises a CCD (charge coupled device), CMOS (complementary metal oxide semiconductor), or the like. The image sensor 112 generates electric signals according to the incident light collected by the optical device 111. The image sensor 112 outputs the generated electric signals as analog signals.

The image processor 120 processes the electric signals generated in the image capture operation by the image capturer 110, then generates digital data showing the captured image. Furthermore, the image processor 120 conducts image processing on the captured image. The image processor 120 comprises a controller 121, an integrated circuit 122, a storage 123, and an external storage 124.

The controller 121 comprises a processor such as a CPU (central processing unit) and a main storage such as a RAM (random access memory). The controller 121 operates according to the programs stored in the storage 123 described later to realize the functions necessary for the operation of the digital camera 100.

The integrated circuit 122 comprises an ADC (analog-to-digital converter), buffer memory, image processing processor (so-called image processing engine), YUV image generator, and the like. The ADC converts the analog electric signals output from the image sensor 112 to digital signals and stores the digital signals in the buffer memory. Then, the image processing engine generates digital data showing the captured image based on the buffered digital signals. The YUV image generator converts the generated digital data to a YUV (luminance signal (Y), difference between luminance signal and blue component (U), and difference between luminance signal and red component (V)) image.

The storage 123 comprises a nonvolatile memory such as a ROM (read only memory).

The storage 123 stores programs necessary for the operation of the digital camera 100 and the like. In this embodiment, the storage 123 stores programs read by the controller 121, data showing thresholds used in the shape recognition procedure described later, and the like.

The external storage 124 comprises a nonvolatile memory detachable to the digital camera 100 such as a SD (secure digital) card. Images captured by the digital camera 100 are stored in the external storage 124.

The interface 130 is a structure regarding interface to the user of the digital camera 100 or to an external device, and comprises a display 131, an external interface 132, and an operation unit 133.

The display 131 comprises a liquid crystal display, organic EL (electroluminescence) display, or the like. The display 131 displays/outputs various screens necessary for operating the digital camera 100, a live view showing the image captured by the digital camera 100 in real time, and captured images. After operating the operation unit 133 of the digital camera 100, the user can view an image corresponding to the operation on the display 131.

The external interface 132 comprises a USB (universal serial bus) connector, video output terminals, or the like. The external interface 132 outputs captured images to a PC, or an external device, and/or displays/outputs captured images on an external monitor via a cable.

The operation unit 133 comprises various buttons. Various buttons include, for example, a shutter button for instructing the capture operation, a mode button for selecting the operation mode of the digital camera 100, and function buttons for various settings. Furthermore, the mode button includes, for example, a shape recognition mode button for starting the shape recognition procedure (for example, a button for switching to the shape recognition mode to recognize a tag in the form of a circular image).

Figure 2:
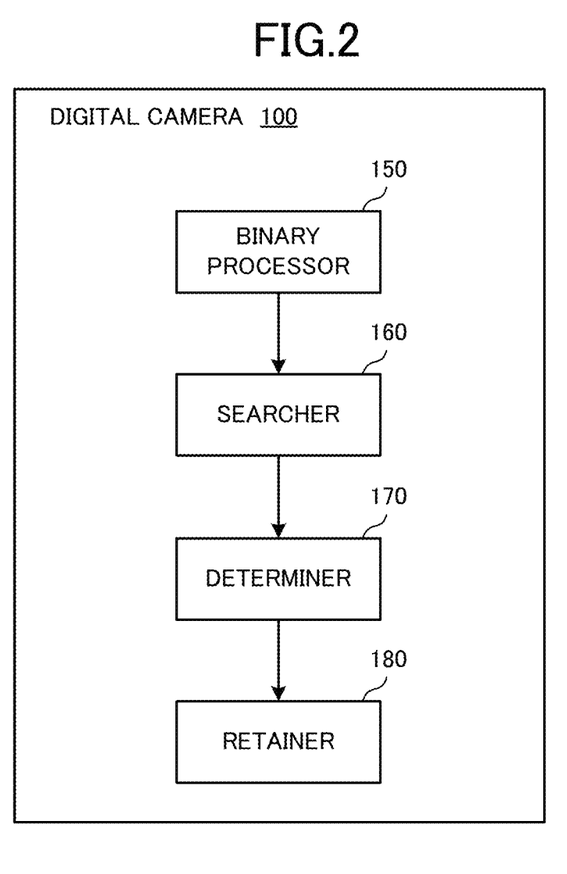
FIG. 2 is a block diagram showing the functional configuration of the digital camera.

In this embodiment, the controller 121 executes programs stored in the storage 123 so as to realize the functions of the components regarding the shape recognition procedure shown in FIG. 2. Functionally, as shown in FIG. 2, a binary processor 150, a searcher 160, a determiner 170, and a retainer 180 are provided. In this embodiment, the shape recognition of a circular image will be described by way of example.

The binary processor 150 binarizes a live view image using thresholds of parameters such as luminance and chrominance. Here, in this embodiment, the luminance defines the degree of brilliance of an image and the chrominance defines the degree of vividness of an image. The luminance and chrominance have the minimum value of 0 and the maximum value of 255. An image changes from dark to bright as the luminance changes from the minimum value to the maximum value. An image changes from achromatic to chromatic as the chrominance changes from the minimum value to the maximum value.

Figure 3:
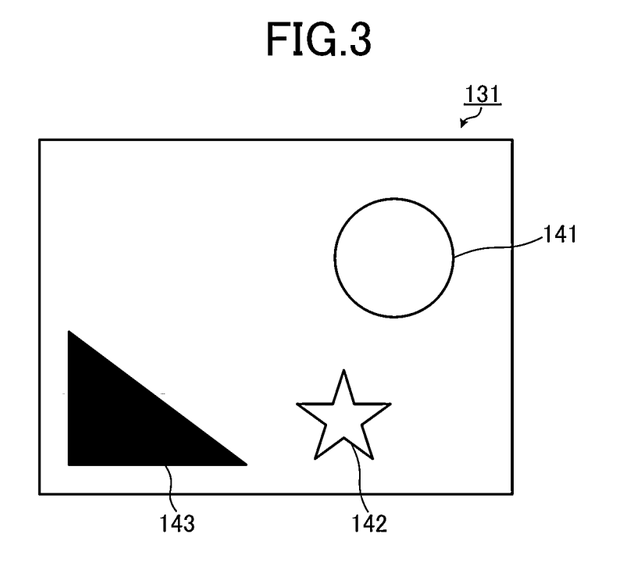
FIG. 3 is an illustration showing an exemplary live view displayed on the display of the digital camera.

Here, as the user presses down the shape recognition mode button during the live view mode, the binary processor 150 binarizes the image appearing on the display 131 in FIG. 3, for example. The displayed image in FIG. 3 contains, for example, a circular shape marker for visible light communication (also called an ID tag) 141 emitting light that periodically changes in color within a given luminance range, a light source 142 simply emitting light, and an object image 143. In this embodiment, the binary processor 150 binarizes the image based on the thresholds of the luminance and chrominance stored in the storage 123, and stores in the storage 123 a binary image comprising valid pixels of 0xFF where the luminance and chrominance are equal to or higher than the thresholds and invalid pixels of 0x00 where the luminance and chrominance are lower than the thresholds. With this binarization, a 24-bit color image is turned into a 1-bit monochrome image.

Incidentally, in consideration for the case in which the shape recognition target circle is in a chromatic color, the luminance and chrominance thresholds are set to thresholds with which any color (such as red, blue, yellow) can be turned into a valid pixel in order to recognize the marker 141. In this embodiment, the luminance and chrominance thresholds are set to 120 and 150, respectively, by way of example.

Figure 4A:
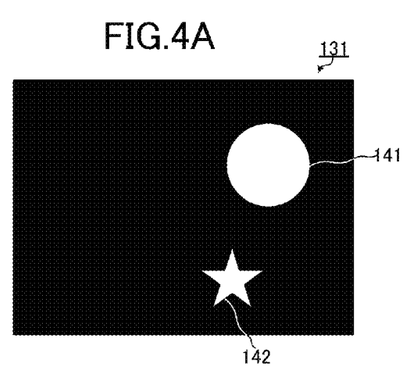
FIG. 4A is an illustration showing one of the steps of the circular shape recognition procedure.

A binary image shown in FIG. 4A is obtained from the image in FIG. 3 through the above-described binarization by the binary processor 150. This binary image shows that the object image 143 and background in the image before the binarization were lower than the thresholds and then turned into invalid images (=black) and the marker 141 and light source 142 were equal to or higher than the thresholds and then turned into valid pixels (=white).

Figure 4B:
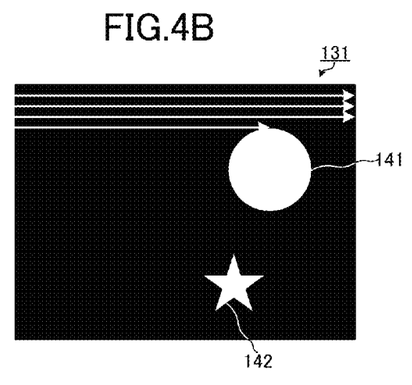
FIG. 4B is an illustration showing one of the steps of the circular shape recognition procedure.

Returning to FIG. 2, the searcher 160 searches for a valid pixel that is a pixel satisfying a given condition from the binary image. More specifically, as shown in FIG. 4B, the searcher 160 searches for a valid pixel by sequentially scanning the binary image on a pixel column basis line by line from the top left corner of the binary image.

Then, the determiner 170 determines whether a valid pixel is detected while the searcher 160 searches for a valid pixel. More specifically, the determiner 170 detects a valid pixel during the search by determining whether there is a change of the binary value (0x00 or 0xFF) from 0x00 indicating an invalid pixel to 0xFF indicating a valid pixel. In FIG. 4B, the determiner 170 has detected a valid pixel during the search on the fourth line.

Figure 4C:
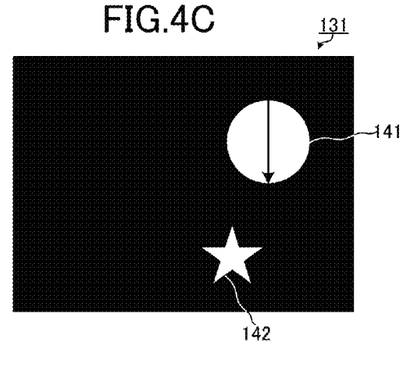
FIG. 4C is an illustration showing one of the steps of the circular shape recognition procedure.

Then, if a valid pixel is detected, the determiner 170 determines whether the region comprising a set of valid pixels is in the shape of the visible light communication marker, namely a circle. More specifically, the determiner 170 obtains, as shown in FIG. 4C, the length of valid pixels in the vertical direction on the assumption that the valid pixel is at the upper end of the detected marker 141. In order to do that, the determiner 170 counts the number of valid pixels successively present in the vertical direction to obtain one length of the region comprising a set of valid pixels. Then, assuming that the obtained length in the vertical direction is the diameter, the determiner 170 obtains the radiuses in the vertical direction of a tentative circle.

Figure 4D:
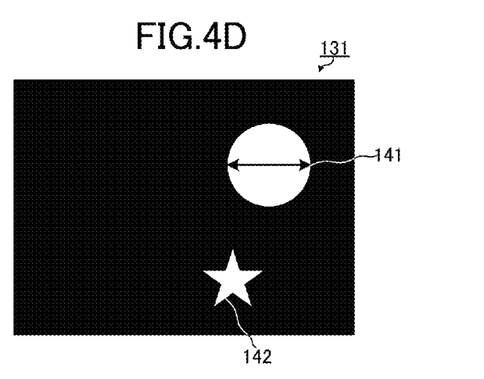
FIG. 4D is an illustration showing one of the steps of the circular shape recognition procedure.

Then, the determiner 170 obtains, as shown in FIG. 4D, the right and left radiuses in the horizontal direction from the center of the obtained diameter. In order to do that, the determiner 170 similarly counts the number of right and left valid pixels in the horizontal direction to obtain the radiuses in the horizontal direction. Then, the determiner 170 determines whether the region comprising the set of valid pixels is nearly circle based on the obtained radiuses in the vertical and horizontal directions. For example, the region is determined to be not circle if the radiuses in the vertical direction and the radiuses in the horizontal direction are different from more than given pixels. Alternatively, the region can be determined to be not circle if the diameter in the vertical direction and the diameter in the horizontal direction are different from more than given pixels, or if the right and left radiuses in the horizontal direction are unbalanced (for example, one of the right and left radiuses in the horizontal direction is longer than the other by given pixels or more). The above given pixels can be set on an arbitrary basis according to the accuracy of detection.

Here, even if the determiner 170 determines that the region is nearly circle based on the obtained lengths of the diameters or radiuses, an ellipse may be contained because of significantly mismatched diameters/radiuses. Then, from the viewpoint of improving the reliability and accuracy, the determiner 170 further determines whether the region comprising the set of valid pixels is circle based on the area of the region.

Figure 4E:
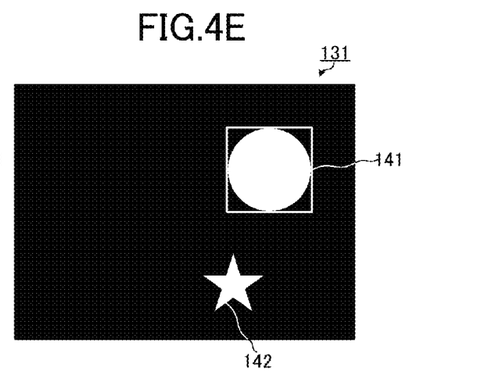
FIG. 4E is an illustration showing one of the steps of the circular shape recognition procedure.

More specifically, as shown in FIG. 4E, the determiner 170 sets a circumscribed quadrangle circumscribing the circular region. The determiner 170 scans the set circumscribed quadrangle and counts the number of invalid pixels and number of valid pixels. Then, the determiner 170 assumes that the total pixel number, that is invalid pixel number and valid pixel number, represents the area of the circumscribed quadrangle and the number of valid pixels represents the area of the circle. Then, the determiner 170 obtains the area ratio from the area of the circumscribed quadrangle and the area of the circle and determines whether the region is circle based on the obtained area ratio. Upon this determination, the ordinary area ratio of a circle to its circumscribed quadrangle is used for the above determination.

For obtaining the ordinary area ratio, first, the area of a circle having a radius of r is $\pi r^2$ and the area of the circumscribed quadrangle is $2r \times 2r = 4r^2$. Form these areas, the ordinary area ratio is $\pi r^2/4r^2 = 79\%$ (rounded off to unit). This ordinary area ratio is used as the prescribed area ratio and compared with the area ratio obtained by the determiner 170 to determine whether the region is circle. Also upon this comparison, it is possible to require, for example, perfect match, or to set an error range of 79%±a given % and determine whether the ratio is within the error range so as to determine whether the region is circle.

Then, if the determiner 170 determines that the region is circle, the retainer 180 retains position information showing the position of the region comprising the set of valid pixels and determined to be circle. More specifically, the retainer 180 retains in the storage 123 the coordinates and the length of the radius of the circle as the position information. The coordinates can be the coordinates (x, y) of all valid pixels constituting the circle in which x refers to the horizontal direction and y refers to the vertical direction with the origin at the top left corner of the binary image or the coordinates of the valid pixels constituting the circumference.

Figure 4F:
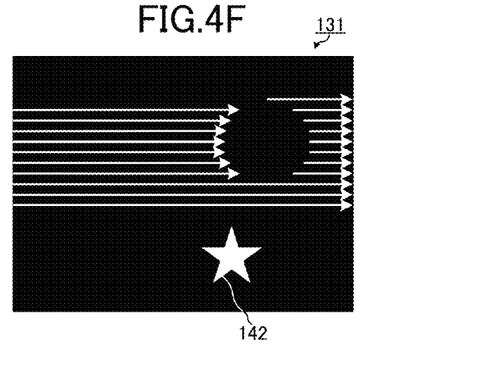
FIG. 4F is an illustration showing one of the steps of the circular shape recognition procedure.

Then, as shown in FIG. 4F, the determiner 170 rewrites the circular region comprising the set of valid pixels (corresponding to the marker 141) with invalid pixels as already detected pixels so that this region will not be scanned again. Then, as shown in FIG. 4F, the searcher 160 restarts the search for a valid pixel except for the circular region.

The functions regarding the circular shape recognition procedure realized by the controller 121 are described above.

The flow of the circular shape recognition procedure will be described hereafter with reference to FIG. 5. The circular shape recognition procedure in FIG. 5 starts when the user presses down the shape recognition mode button during the live view mode. Then, the controller 121 reads threshold data necessary for the circular shape recognition procedure along with programs regarding this procedure. The controller 121 loads the read programs and data on its own RAM and executes the following procedure by means of the functions.

First, the binary processor 150 executes binarization (Step S11). More specifically, the binary processor 150 binarizes the live view image using the thresholds of parameters such as the luminance and chrominance as described above (see FIG. 4A).

Then, the determiner 170 detects a valid pixel (Step S12). More specifically, the determiner 170 detects a valid pixel while the searcher 160 searches for a valid pixel corresponding to the marker 141 (see FIG. 4B). Incidentally, the circular shape recognition procedure ends if the determiner 170 cannot detect any valid pixel in all pixels of the binary image.

Then, the determiner 170 obtains the radiuses in the vertical direction of a tentative circle (Step S13). More specifically, the determiner 170 obtains the length of valid pixels in the vertical direction on the assumption that the detected valid pixel is situated at the upper end of the circle and obtains the radiuses in the vertical direction of the tentative circle using the obtained length in the vertical direction as the diameter (see FIG. 4C).

Then, the determiner 170 obtains the radiuses in the horizontal direction of the tentative circle (Step S14). More specifically, the determiner 170 counts the numbers of right and lefts valid pixels in the horizontal direction to obtain the radiuses in the horizontal direction (see FIG. 4D).

Then, the determiner 170 determines whether the radiuses obtained in the Steps S13 and S14 are different from more than given pixels (Step S15). Here, the radiuses in the vertical direction in the Step S13 are same length because they are obtained by dividing the diameter in the vertical direction into two. On the other hand, the right and left radiuses in the horizontal direction are obtained by counting the number of valid pixels from the center of the tentative circle, whereby there is a possibility that the right and left radiuses are different. Then, the determiner 170 determines whether the right and left radiuses in the horizontal direction are different from more than given pixels with respect to the radiuses in the vertical direction in the Step S15.

Here, if neither of the radiuses in the horizontal direction is different from more than given pixels with respect to the radiuses in the vertical direction (Step S15; No), the determiner 170 determines that the region comprising the set of valid pixels is nearly circle and proceeds to Step S16. On the other hand, if at least one of the right and left radiuses in the horizontal direction is different from more than given pixels with respect to the radiuses in the vertical direction (Step S15; Yes) (in other words (1) if one radius in the horizontal direction is different with respect to the radiuses in the vertical direction and (2) if both radiuses in the horizontal direction are different with respect to the radiuses in the vertical direction), the determiner 170 determines that the region comprising the set of valid pixels is not circle and the procedure ends.

If the region comprising the set of valid pixels is nearly circle, the determiner 170 sets a circumscribed quadrangle circumscribing the circle in Step S16 (see FIG. 4E).

Then, the determiner 170 obtains the area ratio from the area of the circumscribed quadrangle and the area of the circle (Step S17). More specifically, the determiner 170 scans the circumscribed quadrangle, and obtains the area ratio on the assumption that the total pixel number, that is invalid pixel number and valid pixel number, represents the area of the circumscribed quadrangle and the number of valid pixels represents the area of the circle.

Then, the determiner 170 determines whether the area ratio obtained in the Step S17 is within a prescribed area ratio error range (Step S18). More specifically, the determiner 170 determines whether the area ratio obtained in the Step S17 is within a given error range from 79%, which is the prescribed area ratio.

Here, if it is not within a given error range (Step S18: No), the determiner 170 determines that the shape assumed to be nearly circle in the Step S15 is not a circle and the procedure ends.

On the other hand, if it is within a given error range (Step S18: Yes), the determiner 170 determines that the shape assumed to be nearly circle in the Step S15 is a circle and the retainer 180 retains the position information of the circle (Step S19). More specifically, the retainer 180 retains in the storage 123 the coordinates and the length of the radiuses of the circle that are position information showing the position of the region comprising the set of valid pixels determined to be circle.

Then, the determiner 170 rewrites the circular region comprising the set of valid pixels with invalid pixels (Step S20) and the procedure ends. After this rewriting, the searcher 160 restarts the search for a valid pixel except for the circular region (see FIG. 4F), and the processing of the Steps S12 to S20 is repeated until the search for a valid pixel is completed on all pixels of the binary image.

On the other hand, if the region comprising the set of valid pixels is determined to be not circle in the Step S15 or S18, the searcher 160 restarts the search for a valid pixel except for the region determined to be not circle, and the processing of the Steps S12 to S20 is repeated until the search for a valid pixel is completed on all pixels of the binary image. Incidentally, when the searcher 160 restarts the search, the region determined to be not circle can be rewritten to invalid pixels.

Figure 5:
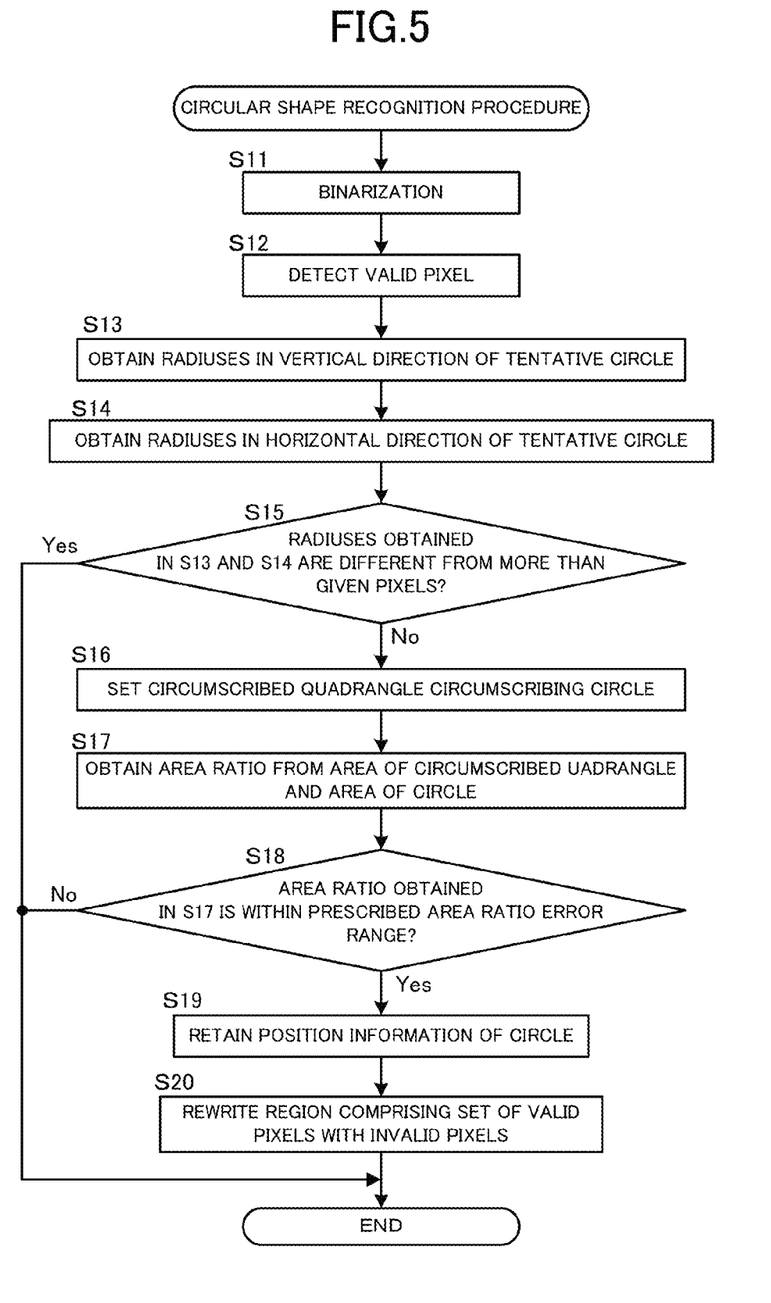
FIG. 5 is a flowchart showing an exemplary flow of the circular shape recognition procedure.

In the circular shape recognition procedure of FIG. 5, the controller 121 of the digital camera 100 realizes the functions of the binary processor 150, searcher 160, determiner 170, and retainer 180, whereby it is possible to turn a target image of the shape recognition procedure into a binary image, and recognize the shape in the image using a simple technique based on the area ratio. Thus, the processing load is low and the processing time is short. Hence, the shape in an image can be recognized at a high speed.

A more specific exemplary application will be described using FIG. 6. In this figure, another user appears in the live view displayed on the display 131. This another user is holding a terminal, on the display of which a circle changing in color at fixed time intervals (a visible light communication marker 141) is displayed. In visible light communication, recognizing a circular image changing in color at fixed time intervals and in some pattern (for example, in the order of red, blue, and yellow) (namely a circular image regularly changing in chrominance), the digital camera 100 can receive information associated with the pattern. It is preferable in such visible light communication that the circular image appearing on the display of the terminal is recognized quickly so that the user is not kept waiting.

In the above case, as the user presses down, for example, the visible light mode button for starting visible light communication while another user appears in the live view, the circular image shape recognition can be executed at a high speed by executing the above-described circular shape recognition procedure. Incidentally, another known technique is used to recognize the color pattern of the circular image.

Figure 6:
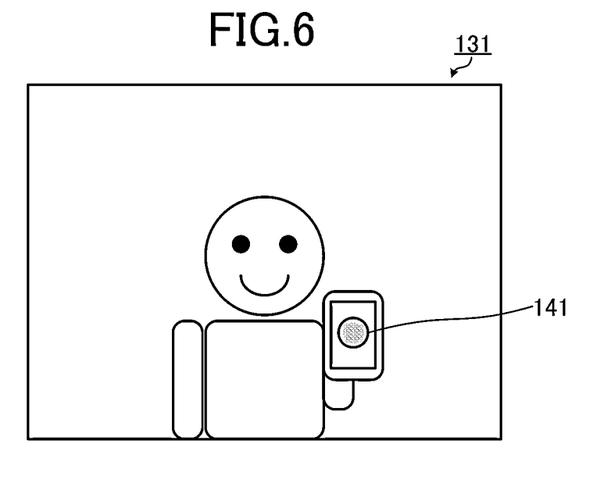
FIG. 6 is an illustration showing another exemplary live view displayed on the display of the digital camera.

Furthermore, another user in FIG. 6 may move during visible light communication and then it is necessary to track the circle. The circular shape recognition procedure of this embodiment can repeatedly detect the circular image at a high speed, whereby the accuracy of tracking is improved.

Modified Embodiment

An embodiment is described above. Needless to say, the specific configuration of the digital camera 100 and the details of the circular shape recognition procedure shown in FIGS. 4A to 4F and FIG. 5 are not confined to those described in the above-described embodiment.

For example, in the above-described embodiment, it is determined in the circular shape recognition procedure of FIG. 5 whether the area ratio obtained in the Step S18 is within a prescribed area ratio error range so as to determine whether the region is circle. This is not restrictive. For example, it is possible to determine whether the image is circle by dividing the circumscribed quadrangle into quarters, obtaining their area ratios, and determining whether the obtained area ratios are each 20% (the value obtained by rounding off one quarter of 79%, which is the prescribed area ratio, to unit). In this way, the accuracy of detecting a circle can be improved. Incidentally, it is possible to allow for a given error to the value of one quarter of the prescribed area ratio. Furthermore, the number of portions the circumscribed quadrangle is divided into can be determined on an arbitrary basis depending on the accuracy.

Furthermore, in the above-described embodiment, it is determined in the step S15 of the shape recognition procedure of FIG. 5 whether the radiuses in the vertical direction and radiuses in the horizontal direction of a tentative circle are different from more than given pixels to determine whether the region is nearly circle. This is not restrictive. For example, in case where detection of a highly accurate circular shape is not required, the procedure can end at the Step S15. In such a case, it is determined in the Step S15 whether the region has a circle-like shape. In this way, the processing of the Steps S16 to S20 can be eliminated, whereby the shape recognition procedure can be executed at a further higher speed.

Figure 7:
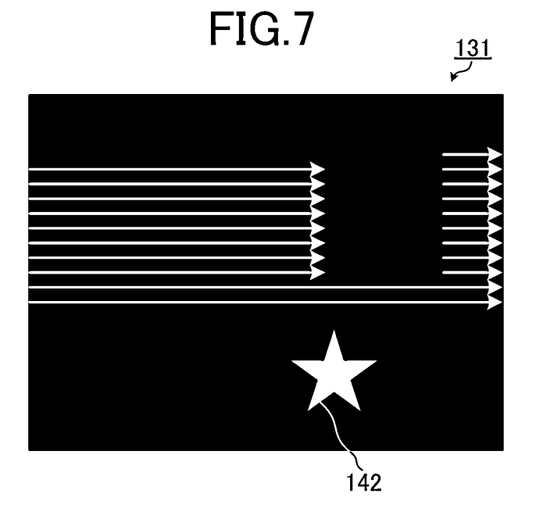
FIG. 7 is an illustration showing a modification of the circular shape recognition procedure.

Furthermore, in the above-described embodiment, if the region is determined to be circle after the circular shape recognition procedure of FIG. 5, the search for a valid pixel is executed except for the circular region. This is not restrictive. For example, if the region is determined to be circle, as shown in FIG. 7, the search for a valid pixel can be executed except for the region of the circumscribed quadrangle. In this way, it is possible to reduce the scanning range and execute the search for remaining valid pixels at a high speed.

Incidentally, in the above explanation, the search is executed except for the region of the circle or circumscribed quadrangle after the region is determined to be circle. However, this does not means that rescanning the region where the circle or circumscribed quadrangle was present is ruled out.

Figure 8:
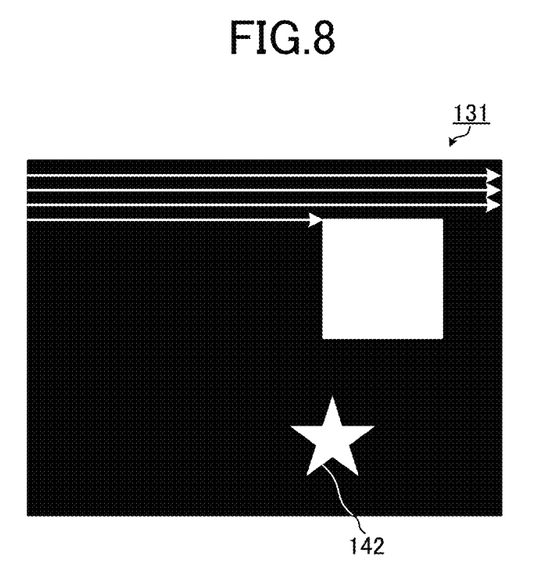
FIG. 8 is an illustration showing an example of the square image shape recognition procedure.

Furthermore, in the above-described embodiment, the shape recognition procedure on a circular image is described. This is not restrictive. For example, the shape recognition procedure on a square as another shape can be executed. In such a case, as shown in FIG. 8, upon detection of a valid pixel, the number of valid pixels in the vertical direction from the detected point is counted to obtain the length of one side, and the length of another side in the horizontal direction is obtained. It is determined whether the lengths of the two sides are nearly equal based on the balance between the obtained length of one side and the obtained length of the other side (for example, whether they are different by given pixels or more). If the lengths of the two sides are neatly equal, a tentative square is assumed and the area of the tentative square obtained by counting the number of valid pixels is compared with the area of the square obtained by the length of a side×2 to determine whether the region is square.

Furthermore, in the above-described embodiment, the explanation is made on the assumption of a YUV color space. This is not restrictive. For example, a RGB color space can be used. In such a case, the brightness is used instead of the luminance as a parameter of which a threshold is used in the binarization.

Furthermore, in the above-described embodiment, the explanation is made on the assumption of the digital camera 100. This is not restrictive. For example, a portable terminal (such as a smart phone) can comprise the image processor 120 shown in FIG. 1 and execute the above-described circular shape recognition procedure. In such a case, if the terminal held by another user shown in FIG. 6 is a portable terminal, the shape recognition procedure is applicable to visible light communication between the portable terminals. For example, information associated with the color pattern of a circle (the another user's personal information (such as telephone number and address) or a message to transmit) can be received by the portable terminal held by the user.

Furthermore, the shape recognition procedure of the image processor 120 of the present disclosure can be realized by a conventional computer such as a PC (personal computer).

More specifically, in the above-described embodiment, the explanation is made on the assumption that the programs for realizing the functions regarding the shape recognition procedure are stored in the storage 123 in advance. However, the programs for realizing the functions of the components in FIG. 2 can be stored and distributed on a non-transitory computer readable recording medium such as a flexible disc, CD-ROM (compact disc read only memory), DVD (digital versatile disk), and MO (magneto-optical disk) and installed on a computer to configure a computer realizing the above-described functions of the components.

Furthermore, the programs can be stored in a disc device of a server unit on a communication network such as the Internet, whereby, for example, a computer can download the programs.

An embodiment of the present disclosure is described above. The embodiment is given by way of example and does not confine the technical scope of the present disclosure. The present disclosure can be realized in various other embodiments, and various modifications including omission and replacement can be made without departing from the gist of the present disclosure. Such embodiments and modifications are included in the disclosure described in the scope of the claims and the scope equivalent thereto.

What is claimed is:

1. An image processing device, comprising:
   an image acquirer which acquires an image;
   a searcher which searches for a pixel satisfying a given condition from the image acquired by the image acquirer;
   a first determiner which determines whether the pixel satisfying the given condition is detected during the search by the searcher;
   a second determiner which determines whether a region comprising a set of pixels has a particular shape when the first determiner determines that the a pixel satisfying the given condition is detected; and
   a retainer which retains position information showing a position of the region comprising the set of pixels when the second determiner determines that the region has the particular shape,
   wherein the second determiner obtains a length of the region in a first direction by counting a number of pixels successively present in a given direction from the pixel satisfying the given condition under a same condition, then determines whether the region has the particular shape by determining whether the obtained length satisfies a particular condition with respect to a length of the region in a second direction.

2. The image processing device according to claim 1, wherein after the retainer retains the position information, the set of pixels of the region is rewritten with invalid pixels indicating that the region has already been detected, and the searcher restarts the search except for the region comprising the set of pixels having been rewritten.

3. The image processing device according to claim 1, wherein:
   the second direction is a direction perpendicular to the first direction, and
   the particular condition is that the difference between the length in the first direction and the length in the second direction is within a given difference.

4. The image processing device according to claim 1, wherein:
   the image acquirer successively acquires images, and
   the region having the particular shape is a region where at least a chrominance changes regularly in the successively acquired images.

5. An image processing method, comprising:
   acquiring an image;
   searching for a pixel satisfying a given condition from the acquired image;
   determining whether the pixel satisfying the given condition is detected by the searching;
   determining whether a region comprising a set of pixels has a particular shape when it is determined that the pixel satisfying the given condition is detected, by (i) obtaining a length of the region in a first direction by counting a number of pixels successively present in a given direction from the pixel satisfying the given condition under a same condition, then (ii) determining whether the obtained length satisfies a particular condition with respect to a length of the region in a second direction; and retaining position information showing a position of the region comprising the set of pixels when it is determined that the region has the particular shape.

6. A non-transitory computer-readable recording medium having a program recorded thereon, the program being executable to control a computer to function as:

an image acquirer which acquires an image;

a searcher which searches for a pixel satisfying a given condition from the image acquired by the image acquirer;

a first determiner which determines whether the pixel satisfying the given condition is detected during the search by the searcher;

a second determiner which determines whether a region comprising a set of pixels has a particular shape when the first determiner determines that the pixel satisfying the given condition is detected; and a retainer which retains position information showing a position of the region comprising the set of pixels when the second determiner determines that the region has the particular shape, wherein the second determiner obtains a length of the region in a first direction by counting a number of pixels successively present in a given direction from the pixel satisfying the given condition under a same condition, then determines whether the region has the particular shape by determining whether the obtained length satisfies a particular condition with respect to a length of the region in a second direction.

* * * * *

UNITED STATES PATENT AND TRADEMARK OFFICE
CERTIFICATE OF CORRECTION

PATENT NO. : 9,275,268 B2
APPLICATION NO. : 14/324458
DATED : March 1, 2016
INVENTOR(S) : Daisuke Otani

Page 1 of 1

It is certified that error appears in the above-identified patent and that said Letters Patent is hereby corrected as shown below:

In the Claims

Column 10, line 19, change "the a pixel" to --the pixel--.

Signed and Sealed this
Twenty-first Day of June, 2016

Michelle K. Lee
*Director of the United States Patent and Trademark Office*